US012749502B2

(12) United States Patent
Ee

(10) Patent No.: US 12,749,502 B2
(45) Date of Patent: Sep. 29, 2026

(54) FLEXIBLE HEAD GIMBAL ASSEMBLY FOR HARD DISK DRIVE DEVICE

(71) Applicant: Magnecomp Corporation, Murrieta, CA (US)

(72) Inventor: Kuen Chee Ee, Chino, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 18/976,060

(22) Filed: Dec. 10, 2024

(65) Prior Publication Data

US 2025/0191610 A1 Jun. 12, 2025

Related U.S. Application Data

(60) Provisional application No. 63/608,684, filed on Dec. 11, 2023.

(51) Int. Cl.
*G11B 5/48* (2006.01)

(52) U.S. Cl.
CPC ............ *G11B 5/4833* (2013.01); *G11B 5/483* (2015.09)

(58) Field of Classification Search
CPC ...... G11B 5/4833; G11B 5/483; G11B 5/4826
See application file for complete search history.

(56) References Cited

U.S. PATENT DOCUMENTS

| | | | | |
|---|---|---|---|---|
| 8,149,545 B1 | 4/2012 | Chai et al. | | |
| 8,797,689 B1 | 8/2014 | Pan et al. | | |
| 11,688,421 B2 | 6/2023 | Glaess et al. | | |
| 2006/0262456 A1* | 11/2006 | Wang | G11B 5/4826 | 360/234.5 |
| 2007/0086115 A1* | 4/2007 | Harris | G11B 5/4826 | |
| 2011/0019310 A1* | 1/2011 | Yao | G11B 5/4853 | 360/234.5 |
| 2011/0096438 A1 | 4/2011 | Takada et al. | | |
| 2021/0358518 A1* | 11/2021 | Ee | G11B 5/484 | |

FOREIGN PATENT DOCUMENTS

| | | |
|---|---|---|
| CN | 101866653 B | 11/2014 |

* cited by examiner

*Primary Examiner* — Steven Lim
*Assistant Examiner* — Michelle J. Kim
(74) *Attorney, Agent, or Firm* — DLA Piper LLP (US)

(57) ABSTRACT

A head gimbal assembly includes a gimbal, a circuit, a slider, a first PCT actuator, and a second PZT actuator. The gimbal includes a base portion and a tongue that are connected by a neck portion, wherein the base portion includes a first opening located adjacent the neck portion such that the base portion is connected to the neck portion by a pair of first connecting struts, and the tongue includes a second opening located adjacent the neck portion such that the tongue is connected to the neck portion by a pair of second connecting struts. The circuit is mounted on the gimbal. The slider is mounted on the tongue, and electrically connected to the circuit. The first PZT actuator and the second PZT actuator are mounted to the head gimbal assembly and electrically connected to the circuit, for displacing the tongue relative to the base portion.

5 Claims, 4 Drawing Sheets

FLEXIBLE HEAD GIMBAL ASSEMBLY FOR HARD DISK DRIVE DEVICE

CROSS-REFERENCE TO RELATED APPLICATIONS

This application claims the benefit of, and priority to, U.S. Provisional Application No. 63/608,684 filed on Dec. 11, 2023, which is hereby incorporated by reference in its entirety.

FIELD OF THE INVENTION

The present disclosure relates to hard disk drives, and more particularly to a head gimbal assembly as part of a suspension assembly for hard disk drives.

BACKGROUND OF THE INVENTION

A hard disk drive (HDD) is a non-volatile storage device that stores digitally encoded data on one or more circular disks having magnetic surfaces. In operation, each disk spins rapidly. Data is read from and written to the disk using a read-write head that is positioned over a specific data track or location on the disk surface by a suspension assembly, which in turn is attached to the arm of the head stack assembly, which is rotated by a voice coil motor or actuator integral to the head stack assembly. Keeping the read-write head stable, and aligned with a targeted data track upon the disk surface defines the primary function of the suspension assembly during hard disk drive operation. Optimized suspension assembly design and manufacture can minimize the effects of mechanical, thermal, and other off-track disturbances which can degrade the performance of the hard disk drive. The suspension assembly includes a load beam. In operation, the actuator positions the distal end of the load beam over the desired portion of the disk (e.g., one of the circular tracks on the disk surface). A gimbal assembly (also referred to as a flexure) is mounted on the distal end of the load beam. The gimbal assembly includes components such as a slider containing the read-write head and microactuator devices (piezoelectric devices, also referred to as PZT herein) that rotate a portion of the gimbal assembly for fine positioning of the slider (as opposed to more coarse positioning of the slider by the actuator). The pressure caused by air viscosity between the slider and the spinning disk causes the slider to hover over (in close proximity to) the surface of the disk. While the load beam is relatively stiff, particularly in the lateral axis, the gimbal assembly is more flexible so that the slider can pitch and roll as it floats over the disk surface in order to maintain its operational distance immediately over the disk surface.

FIG. 1 illustrates a portion of a conventional head stack assembly 2, while FIG. 2 illustrate a conventional head gimbal assembly 10 of the head stack assembly 2. The head stack assembly 2 includes a suspension assembly 3 with a load beam 4 terminating at a proximal end with a hinge 6 that is connected to a baseplate 8. A head gimbal assembly 10 is mounted on the distal end of the load beam 4. The baseplate 8 is connected to an actuator arm 12 of the head stack assembly 2, which is rotated by an integral actuator (not shown).

As best shown in FIGS. 2, head gimbal assembly 10 comprises a gimbal 14 of thin components of sheet metal (e.g., stainless steel), a circuit 16 that includes conductive traces (e.g., copper) and insulation material (e.g., polyimide), a slider 18 (that includes a read/write head) mounted on the gimbal 14 (e.g., by adhesive), and PZT actuators 20 mounted to the gimbal 14. Circuit 16 extends along the load beam 4 and head gimbal assembly 10 for electrical signal communication to the read/write head of the slider 18 and to PZT actuators 20. The conductive traces of the circuit 16 are electrically insulated from the gimbal 14 by the insulation material of the circuit 16.

The gimbal 14 includes a base portion **14*a* and a tongue 14*b*, which are connected by a neck portion 14*c*. The tongue 14*b* is configured to rotate about the neck portion 14*c* (for fine position control of the slider 18). The slider 18 is mounted on the tongue 14*b*. The PZT actuators 20 are mounted to the gimbal 14 between the tongue 14*b* and the base portion 14*a*, for displacing the tongue 14*b* about the neck portion 14*c* and relative to the base portion 14*a* when the PZT actuators 20 expand and contract in response to electrical signals provided by the circuit 16, which provides fine movement control of the slider 18 relative to the disk tracks during operation. In this example, the PZT actuators 20 are indirectly mounted on the gimbal 14, meaning that the PZT actuators 20 are mounted on the circuit 16, which is in turn mounted on the gimbal 14. However, direct mounting is also possible. Also in this example, the PZT actuators 20 are mounted on the upper side of the gimbal 14 (i.e., the side of the gimbal 14 that faces away from the corresponding disk), and the slider 18 (partially viewable in FIG. 2 through opening 22 of gimbal tongue 14*b*) is mounted on the lower side of the gimbal 14 (i.e., the side of the gimbal 14 that faces toward the corresponding disk). However, mounting PZT actuators 20 on the lower side of gimbal 14** is also possible.

The gimbal 14 can be attached to the load beam 4 at three welds locations 24, where the gimbal 14 is spot welded to the load beam 4. Two of the spot welds (referred to herein as proximal welds) can be located at a base portion of the gimbal 14 (closer to the proximal end of the load beam 4) which includes middle struts 26, where the proximal welds are located at the proximal ends of the middle struts 26 of the gimbal 14. The third spot weld (referred to herein as distal weld) is located at a distal end of the gimbal 14 and a distal end of the load beam 4. Outer struts 28 can be components of the gimbal 14 extending between the middle struts 26 and the distal end of the gimbal 14. Connecting struts 30 extend between base portion **14*a* and the junction of middle/outer struts 26, 28**.

In order to achieve a sufficiently high yaw frequency (i.e., the resonant frequency of the head gimbal assembly 10 in the yaw axis), PZT actuators with a shorter length can be used, which have a lower mass that is conducive to a higher yaw frequency. A high yaw frequency can decrease the likelihood of experiencing external vibrations having a frequency matching the natural resonant frequency of the head gimbal assembly 10 that would negatively impact performance. However, shorter PZT actuators have a lower total operational displacement (also referred to as stroke). Therefore, there is a need for higher stroke sensitivity without having to increase the length of the PZT actuators, and without negatively impacting the overall gimbal structure that would reduce yaw frequency.

BRIEF SUMMARY OF THE INVENTION

The aforementioned problems and needs are addressed by a head gimbal assembly that includes a gimbal, a circuit, a slider, a first PZT actuator and a second PZT actuator. The gimbal includes a base portion and a tongue that are connected by a neck portion, wherein the base portion includes a first opening located adjacent the neck portion such that the base portion is connected to the neck portion by a pair of first connecting struts, and the tongue includes a second opening located adjacent the neck portion such that the tongue is connected to the neck portion by a pair of second connecting struts. The circuit is mounted on the gimbal. The slider is mounted on the tongue, and electrically connected to the circuit. The first PZT actuator and the second PZT actuator are mounted to the head gimbal assembly and electrically connected to the circuit, for displacing the tongue relative to the base portion.

A suspension assembly generally includes a baseplate, a load beam connected to the baseplate by a hinge, a gimbal mounted to the load beam, a first PZT actuator and a second PZT actuator. The gimbal includes a base portion and a tongue that are connected by a neck portion, wherein the base portion includes a first opening located adjacent the neck portion such that the base portion is connected to the neck portion by a pair of first connecting struts, and the tongue includes a second opening located adjacent the neck portion such that the tongue is connected to the neck portion by a pair of second connecting struts. A circuit may be mounted on the gimbal. A slider may be mounted on the tongue, and electrically connected to the circuit. The first PZT actuator and the second PZT actuator are mounted to the head gimbal assembly and electrically connected to the circuit, for displacing the tongue relative to the base portion.

Other objects and features of the present disclosure will become apparent by a review of the specification, claims and appended figures.

DETAILED DESCRIPTION OF THE INVENTION

Figure 1:
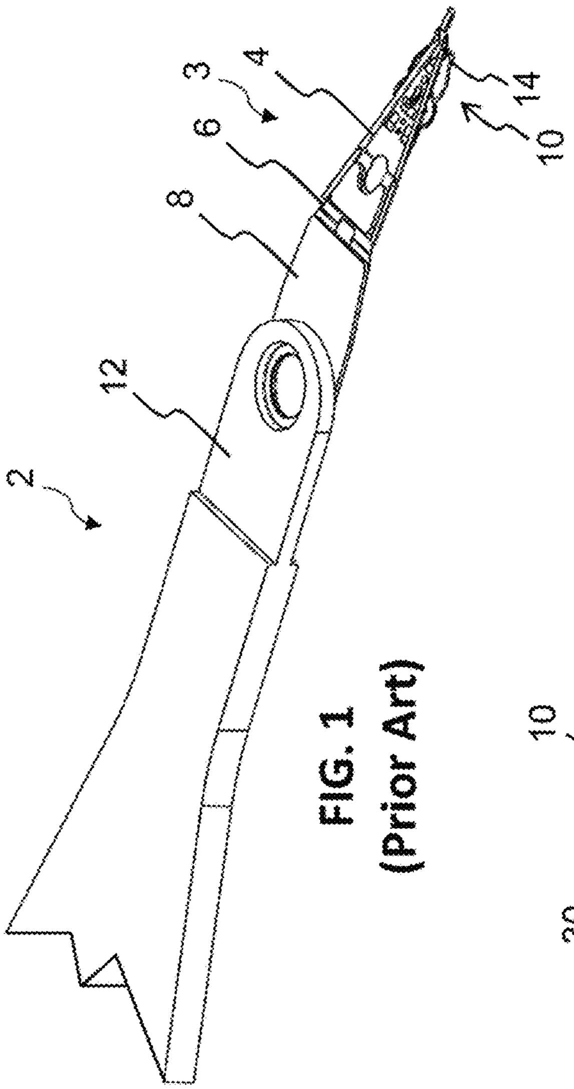
FIG. 1 (Prior Art)
FIG. 1 is a partial perspective view of a conventional head suspension assembly.
Figure 2:
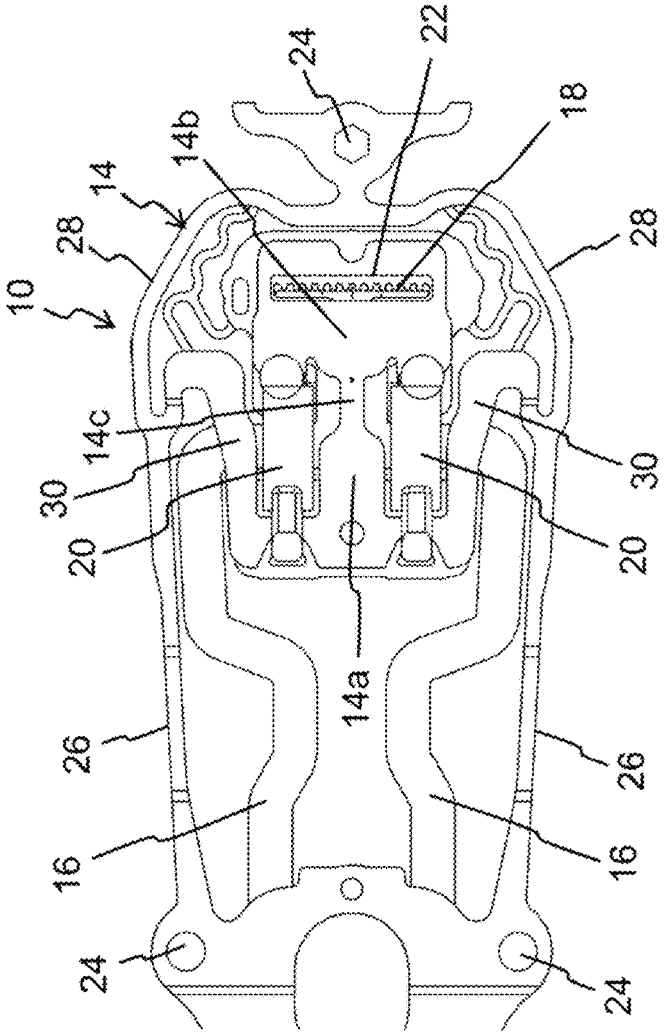
FIG. 2 (Prior Art)
FIG. 2 is a top view of a conventional head gimbal assembly.
Figure 3:
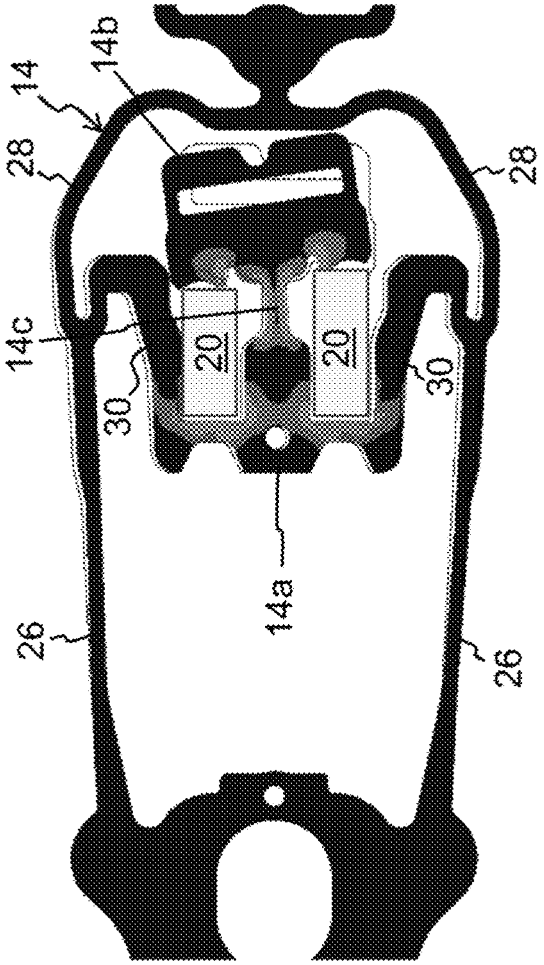
FIG. 3 is a top view of a gimbal illustrating the stress distribution on the gimbal during stroke activation.
Figure 4:
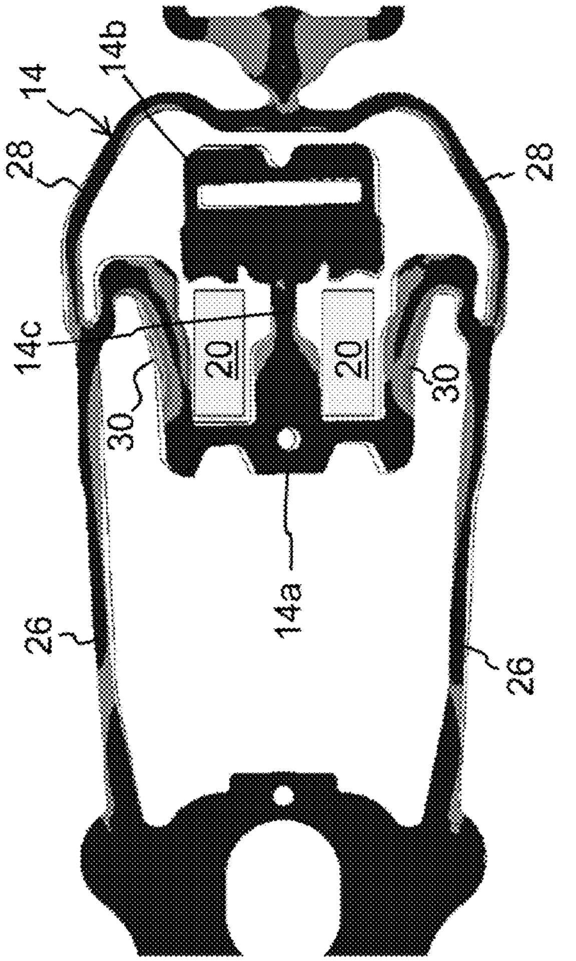
FIG. 4 is a top view of a gimbal illustrating the stress distribution on the gimbal as a function of yaw frequency.
Figure 4:
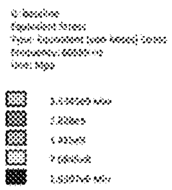

It has been discovered by the present inventor that a more flexible tongue structure for better in-plane (i.e., in the plane of the gimbal 14) rotational movement of the tongue can be achieved to improve stroke actuation without lowering yaw frequency. FIG. 3 illustrates the stress distribution on gimbal 14 of FIG. 2 during stroke activation by the PZT actuators 20 (inducing a counterclockwise rotation of tongue **14*b* when viewed from above). Stroke activation stress is induced primarily in neck portion 14*c*, a portion of tongue 14*b* in the transition area between neck portion 14*c*, and a central portion of base portion 14*a*. FIG. 4 illustrates the stress distribution on gimbal 14 of FIG. 2 for resonance at yaw frequency. Yaw frequency stress is induced primarily in the transition between the neck portion 14*c* and base portion 14*a*, in the connecting struts 30, in the middle struts 26, in the outer struts 28, and in the distal end of the gimbal 14**.

Figure 5:
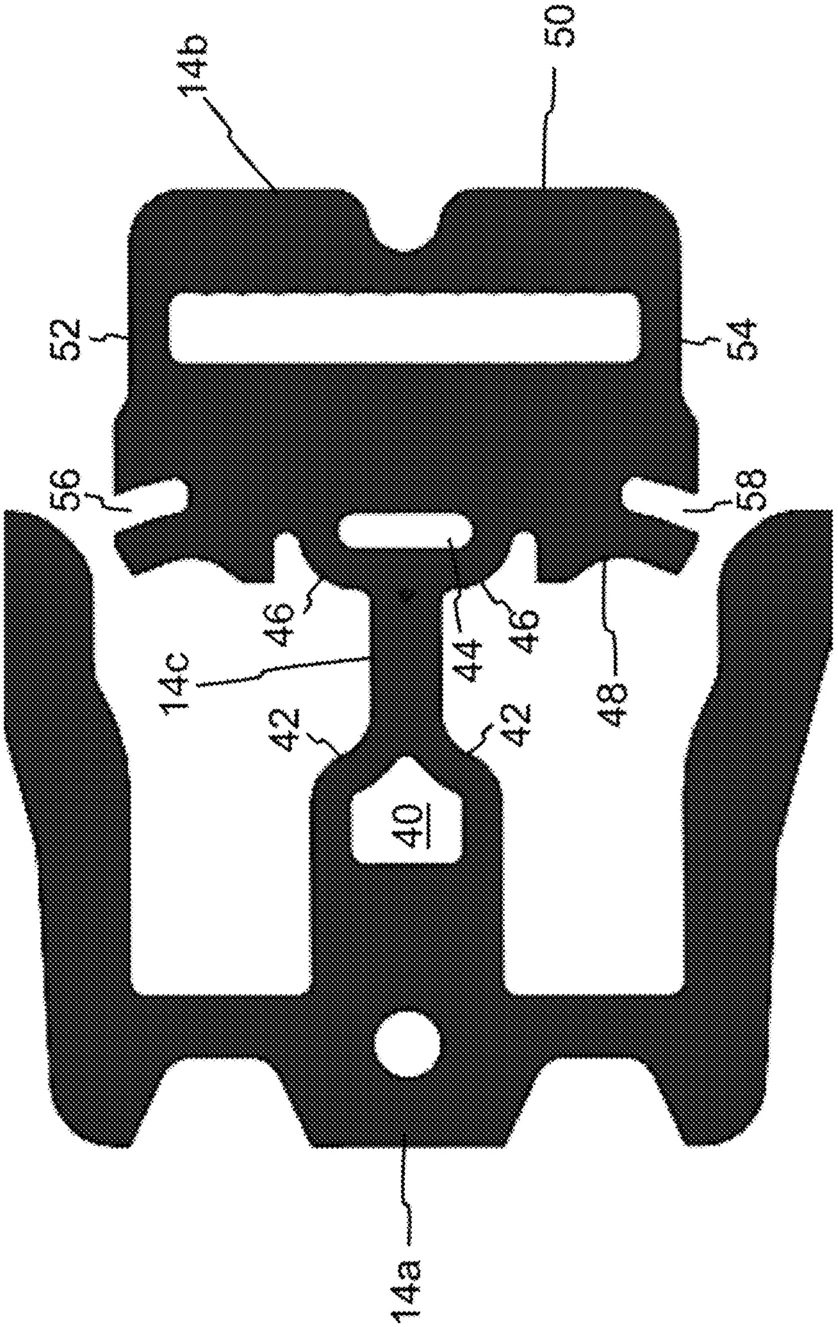
FIG. 5 is a top view of the base portion, tongue and neck portion of an example of a gimbal.

FIG. 5 illustrates a partial view of the base portion **14*a*, tongue 14*b*, and neck portion 14*c* of gimbal 14 described above, but with additional inventive features described below that increase stroke sensitivity while maintaining yaw frequency in accordance with the present disclosure. Base portion 14*a* further includes a first opening 40 located adjacent the neck portion 14*c*, such that the base portion 14*a* is connected to the neck portion 14*c* by a pair of first connecting struts 42. Tongue 14*b* includes a second opening 44 located adjacent the neck portion 14*c*, such that the tongue 14*b* is connected to the neck portion 14*c* by a pair of second connecting struts 46. The first and second connecting struts 42, 46 provide more in-plane flexibility of the gimbal 14 compared to having a solid connection between the neck portion 14*c* and the base portion 14*a* and tongue 14*b*. Moreover, providing additional flexibility adjacent both ends of the tongue 14*b* in this manner provides increased flexibility around regions of high stroke activation stress (see FIG. 3) while avoiding the regions of high yaw frequency stress (see FIG. 6**).

Tongue **14*b* further includes a proximal edge 48 connected to the neck portion 14*c*, a distal edge 50 facing away from the neck portion 14*c*, and opposing first and second lateral edges 52, 54 extending between the proximal edge 48 and the distal edge 50. A first cutout 56 is formed into the first lateral edge 52, and a second cutout 58 is formed in the second lateral edge 54. Both cutouts 56 and 58 act to provide some additional flexibility for the stroke actuation. As shown in FIG. 3, during stroke actuation to rotate the tongue 14*b*, the portions of proximal edge 48 closer to the lateral edges experience more distortion than portions of the proximal edge 48 closer to the neck portion 14*c*. Adding the cutouts 56 and 58 make the push-pull actions for the PZT actuators 20 focus on the inner portion of tongue 14*b* while the more flexible outer portion of tongue 14 (due to cut outs 56 and 58**) gives less obstruction to the push-pull actions.

Figure 6:
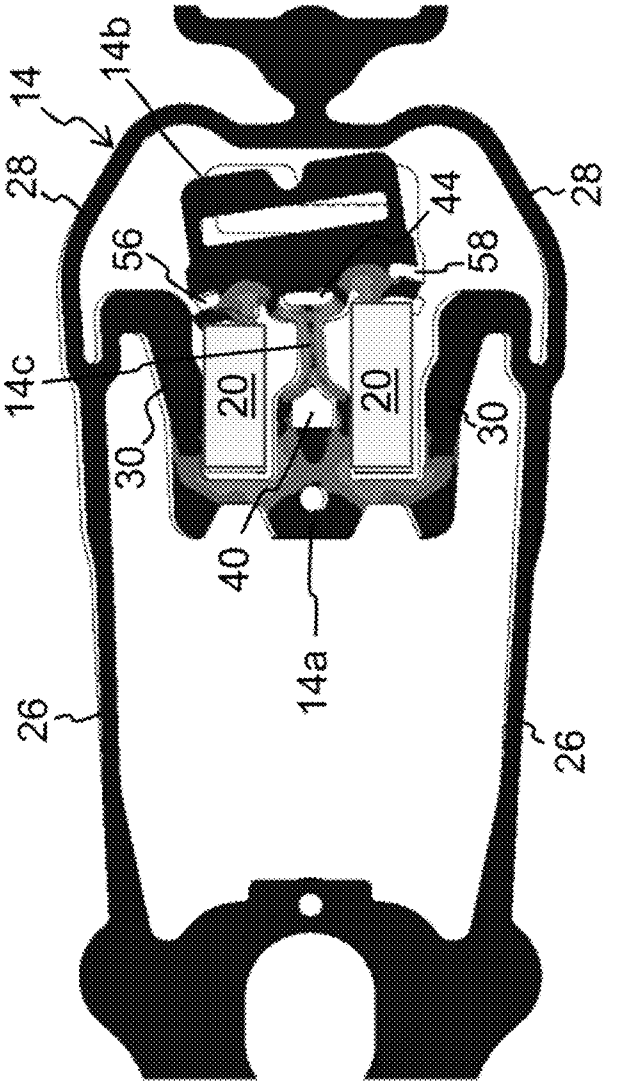
FIG. 6 is a top view of the gimbal of FIG. 5 illustrating the stress distribution on the gimbal during stroke activation.

FIG. 6 shows the stress distribution of stroke actuation for the gimbal 14 having the base portion **14*a*, tongue 14*b*, and neck portion 14*c* of FIG. 5. As shown, the stress distribution is similar to FIG. 3**, indicating the tongue structural rigidity is minimally impacted while the cutout or material removal has provided more flexibility for stroke.

It is to be understood that the present disclosure is not limited to the example(s) described above and illustrated herein, but encompasses any and all variations falling within the scope of any claims. For example, the PZT actuator actuators 20 can be mounted on either side of the gimbal 14. References to the present invention, embodiments or examples herein are not intended to limit the scope of any claim or claim term, but instead merely make reference to one or more features that may be covered by one or more of the claims. Materials, processes and numerical examples described above are exemplary only, and should not be deemed to limit the claims.

What is claimed is:

1. A head gimbal assembly comprising:

a gimbal having a base portion and a tongue that are connected by a neck portion, wherein:

the base portion includes a first opening located adjacent the neck portion such that the base portion is connected to the neck portion by a pair of first connecting struts that define a shape of the first opening, and the tongue includes a second opening located adjacent the neck portion such that the tongue is connected to the neck portion by a pair of second connecting struts that define a shape of the second opening;

a circuit mounted on the gimbal;

a slider mounted on the tongue, and electrically connected to the circuit; and a first PZT actuator and a second PZT actuator mounted to the head gimbal assembly and electrically connected to the circuit, for displacing the tongue relative to the base portion.

2. The head gimbal assembly of claim 1, wherein the tongue further includes:

a proximal edge connected to the neck portion;

a distal edge facing away from the neck portion;

a first lateral edge extending between the proximal edge and the distal edge;

a second lateral edge extending between the proximal edge and the distal edge;

a first cutout formed into the first lateral edge, and a second cutout formed in the second lateral edge.

3. A suspension assembly comprising:

a baseplate;

a load beam connected to the baseplate by a hinge;

a gimbal mounted to the load beam, wherein the gimbal comprises a base portion and a tongue that are connected by a neck portion, wherein:

the base portion includes a first opening located adjacent the neck portion such that the base portion is connected to the neck portion by a pair of first connecting struts that define a shape of the first opening, and the tongue includes a second opening located adjacent the neck portion such that the tongue is connected to the neck portion by a pair of second connecting struts that define a shape of the second opening;

a circuit mounted on the gimbal;

a slider mounted on the tongue, and electrically connected to the circuit; and a first PZT actuator and a second PZT actuator mounted to the gimbal.

4. The suspension assembly of claim 3, wherein the tongue further includes:

a proximal edge connected to the neck portion;

a distal edge facing away from the neck portion;

a first lateral edge extending between the proximal edge and the distal edge;

a second lateral edge extending between the proximal edge and the distal edge;

a first cutout formed into the first lateral edge, and a second cutout formed in the second lateral edge.

5. The suspension assembly of claim 3, wherein the first PZT actuator and second PZT actuator mounted to the gimbal are electrically connected to the circuit for displacing the tongue relative to the base portion.

* * * * *